(12) United States Patent
Sugioka et al.

(10) Patent No.: US 8,381,701 B2
(45) Date of Patent: Feb. 26, 2013

(54) BIO-DIESEL FUEL ENGINE SYSTEM AND BIO-DIESEL FUEL ENGINE OPERATING METHOD

(76) Inventors: Tetuo Sugioka, Okayama (JP); Akira Sakamoto, Gunma (JP)

( * ) Notice: Subject to any disclaimer, the term of this patent is extended or adjusted under 35 U.S.C. 154(b) by 1260 days.

(21) Appl. No.: 12/160,901

(22) PCT Filed: Jan. 11, 2007

(86) PCT No.: PCT/JP2007/050194
§ 371 (c)(1),
(2), (4) Date: Jul. 15, 2008

(87) PCT Pub. No.: WO2007/083551
PCT Pub. Date: Jul. 26, 2007

(65) Prior Publication Data
US 2010/0218734 A1  Sep. 2, 2010

(30) Foreign Application Priority Data
Jan. 17, 2006 (JP) .................. 2006-009282

(51) Int. Cl.
*F02M 43/00* (2006.01)
*F02B 43/00* (2006.01)
*F02B 43/08* (2006.01)
*F02B 13/00* (2006.01)

(52) U.S. Cl. .................. 123/304; 123/1 A; 123/2; 123/3; 123/575

(58) Field of Classification Search .................. 123/1 A, 123/2, 3, 198 R, 198 A, 304, 575, 576, 578
See application file for complete search history.

(56) References Cited

U.S. PATENT DOCUMENTS

| 3,807,377 | A  | * | 4/1974  | Hirschler et al.     | 123/575   |
|-----------|----|---|---------|----------------------|-----------|
| 4,083,698 | A  | * | 4/1978  | Wenzel et al.        | 44/301    |
| 4,451,267 | A  | * | 5/1984  | Schwab et al.        | 44/302    |
| 5,125,367 | A  | * | 6/1992  | Ulrich et al.        | 123/25 E  |
| 5,353,760 | A  | * | 10/1994 | Zager                | 123/196 S |
| 6,174,501 | B1 | * | 1/2001  | Noureddini           | 422/618   |
| 6,382,170 | B1 | * | 5/2002  | Mang et al.          | 123/196 A |
| 6,453,830 | B1 | * | 9/2002  | Zauderer             | 110/345   |
| 6,869,212 | B2 | * | 3/2005  | Uesugi et al.        | 366/164.6 |
| 7,258,105 | B2 | * | 8/2007  | Kangler              | 123/434   |
| 7,404,411 | B2 | * | 7/2008  | Welch et al.         | 137/3     |
| 7,645,067 | B2 | * | 1/2010  | Uesugi et al.        | 366/262   |
| 2003/0118960 | A1 | * | 6/2003 | Balmer-Millar et al. | 431/146  |
| 2004/0090862 | A1 |   | 5/2004  | Uesugi et al.        |          |
| 2005/0108927 | A1 | * | 5/2005 | Velappan et al.      | 44/605   |
| 2005/0126070 | A1 |   | 6/2005  | Krull                |          |
| 2005/0270896 | A1 |   | 12/2005 | Oogawara et al.      |          |

(Continued)

FOREIGN PATENT DOCUMENTS

| DE | 100 42 698 A1 | 3/2002 |
| DE | 103 51 962 A1 | 5/2004 |

(Continued)

*Primary Examiner* — Nathaniel Wiehe
*Assistant Examiner* — Tea Holbrook
(74) *Attorney, Agent, or Firm* — DLA Piper LLP (US)

(57) ABSTRACT

A bio-diesel fuel engine system and bio-diesel fuel engine operating method capable of producing a biomass fuel from a liquid state biomass source material of a fat-containing vegetable or animal oil allowing fuel to be combusted in a conventional diesel engine while providing the benefits of low fuel consumption, stable engine operation, and extended engine service life, with compared to use a biomass fuel reformed by methyl-ester method.

7 Claims, 4 Drawing Sheets

U.S. PATENT DOCUMENTS

| | | | |
|---|---|---|---|
| 2006/0037237 A1* | 2/2006 | Copeland et al. | 44/605 |
| 2006/0191190 A1* | 8/2006 | Wang | 44/300 |
| 2006/0213196 A1 | 9/2006 | Sukioka | |
| 2007/0062100 A1* | 3/2007 | Snower et al. | 44/307 |
| 2007/0062496 A1* | 3/2007 | Snower et al. | 123/549 |

FOREIGN PATENT DOCUMENTS

| | | |
|---|---|---|
| DE | 103 57 878 A1 | 7/2005 |
| EP | 1 541 663 A1 | 6/2005 |
| EP | 1 552 879 A1 | 7/2005 |
| JP | 10 169523 A | 6/1998 |
| JP | 11-182820 A | 7/1999 |
| JP | 2000-263062 A | 9/2000 |
| JP | 2002-98325 A | 4/2002 |
| JP | 2003-55672 A | 2/2003 |
| JP | 2003-294221 A | 10/2003 |
| JP | 2004-160288 A | 6/2004 |
| JP | 2004-198050 A | 7/2004 |
| JP | 2004 263572 A | 9/2004 |
| JP | 2005-069061 A | 3/2005 |
| JP | 3111006 U | 5/2005 |
| JP | 2005-200637 A | 7/2005 |
| WO | 99/30831 A1 | 6/1999 |
| WO | 2004/004881 A1 | 4/2004 |
| WO | 2004/094570 A1 | 11/2004 |

* cited by examiner

(a) fuel particulate diameter of 20 micron meter order (b) biomass fuel particulate diameter of less than 10 micron meter order

BIO-DIESEL FUEL ENGINE SYSTEM AND BIO-DIESEL FUEL ENGINE OPERATING METHOD

RELATED APPLICATIONS

This is a §371 of International Application No. PCT/JP2007/050194, with an international filing date of Jan. 11, 2007 (WO 2007/083551 A1, published Jul. 26, 2007), which is based on Japanese Patent Application No. 2006-009282, filed Jan. 17, 2006.

TECHNICAL FIELD

This disclosure relates to a bio-diesel fuel engine system and bio-diesel fuel engine operating method which allow a conventional diesel engine to operate dependably and economically with reduced fuel consumption through the combustion of a biomass fuel reformulated from a liquid state biomass source material of a fat-containing animal or vegetable-oil through a process which does not employ methyl-ester reforming.

BACKGROUND

Technology relating to the use of animal and vegetable oils for burner combustion is described in Japanese Unexamined Patent Publication Nos. 2003-294221 and 2004-198050. Bio-diesel fuel has been gaining increasing attention in recent years as a fuel for use in diesel engines. That bio-diesel fuel has been reformed from animal and vegetable oils utilizing the methyl-ester process. The methyl-ester process lowers the flash point of animal and vegetable oils and their viscosity to improve their compatibility with fuel injection, thus allowing these oils to be used as fuel for conventional diesel engines.

The following factors should be considered when reforming animal and vegetable oils with, the methyl-ester process:
1. Animal and vegetable oils can be reformed into fuel through a chemical reaction with methanol. As this involves the expense of the equipment needed for the reforming process and the expense of the reforming process itself, the resultant, fuel costs are greater than that required to produce light fuel oil,
2. Additional work and expense are required to remove glycerin which. Is a byproduct generated in the process. Also, the yield of the bio-diesel fuel from animal and vegetable oils is relatively low due to the generation of this byproduct.
3. The glycerin removal process lowers the thermal output of the resulting bio-diesel fuel, thus limiting the power which can be obtained from the fuel.
4. The use of 100% bio-diesel fuel in a diesel engine may result in mechanical seizing and damage due to the lack of a lubricating component unless the fuel is mixed with a petroleum-based fuel such as light oil.

SUMMARY

We provide a bio-diesel fuel engine system and bio-diesel fuel engine operating method whereby a biomass fuel for use in conventional diesel engines may be generated, without employing a methyl-ester reforming process, from a liquid state biomass source material of animal or vegetable oils having a fat component. We provide the advantages of a simple and economical biomass fuel reformation process in which a byproduct is reduced, high yield is obtained, the reformed biomass fuel has desirable lubrication properties which promote engine durability, and a high thermal capacity which acts to stabilize engine operation and lower fuel consumption.

The bio-diesel fuel engine system is characterized by a reformulation means for reforming a liquid state biomass source material of a fat-containing animal or vegetable-oil which is used as a liquid fuel base to which a surfactant is added, to a biomass fuel of which particulate diameter is less than 10 µm by means of atomizing the liquid fuel base by an atomizer. The atomized biomass fuel is supplied through a biomass fuel supply system to a fuel injector which sprays the biomass fuel into the cylinder of a diesel engine to power the engine.

The bio-diesel fuel engine system is further characterized by a petroleum-based fuel supply system in addition to the biomass fuel supply system, and a switching device which connects the biomass fuel supply system and petroleum-based fuel supply system, the switching device switching the supply of fuel from either fuel supply system to the fuel injector.

The bio-diesel fuel engine system is further characterized by a heating, device installed to the biomass fuel supply system as means of heating the biomass fuel.

The bio-diesel fuel engine system is further characterized by a reformulation unit which produces the biomass fuel from the liquid fuel base, incorporates the atomizer, and is detachably connected to the biomass fuel supply system.

The bio-diesel fuel engine system is further characterized by the reformulation unit having a biomass fuel holding tank which stores the reformulated biomass fuel.

The bio-diesel fuel diesel engine system is further characterized by a fuel storage system structured which includes the biomass fuel holding tank and a petroleum fuel holding tank, the petroleum fuel holding tank being detachably connected to the petroleum-based fuel supply system.

The bio-diesel fuel engine operating method, is characterized by the reformulation of a liquid state biomass source material of a fat-containing animal or vegetable oil which is used as a liquid fuel base to which a surfactant is added, the liquid fuel base then being atomized by an atomizer to a particulate diameter of less than 10 µm. The atomized biomass fuel is then supplied through a biomass fuel supply system to a fuel injector which sprays the biomass fuel into the cylinder of a diesel engine to power the engine.

The bio-diesel fuel engine system and bio-diesel fuel engine operating method makes it possible to formulate a biomass, fuel for use in conventional diesel engines from a base liquid biomass material of fat-containing animal or vegetable oils without employing a methyl-ester reforming process. We provide the advantages of a simpler and more economical biomass fuel reformation process which does not produce byproducts and ensures high yield and in which the reformed biomass fuel has desirable lubrication properties and a high thermal capacity to promote engine durability, stabilize engine operation, and lower fuel consumption.

| | |
|---|---|
| 1: | atomizer |
| 51: | fuel injector |
| 50: | biomass fuel supply system |
| 52: | engine cylinder |
| 53: | diesel engine |
| 54: | petroleum fuel supply system |
| 55: | switching valve |
| 56: | heater |
| 57: | reformulation unit |
| 58: | biomass fuel holding tank |
| 59: | petroleum fuel holding tank |

DETAILED DESCRIPTION

The following provides a detailed description of a representative example of a bio-diesel fuel engine system and bio-diesel fuel engine operating method with reference to the attached drawings. As depicted in FIGS. 1 through 4, we produce a biomass fuel formulated from a liquid fuel base in the form of a liquid state biomass source material of a fat-containing animal or vegetable oil. A surfactant is added to the liquid fuel base, after which it is atomized to a particulate diameter of less than 10 μm by an atomizer 1. The biomass fuel is then sent through a biomass fuel supply system 50 to a fuel injector 51 which sprays the biomass fuel into an engine cylinder 52 to operate a diesel engine 53.

Figure 1:
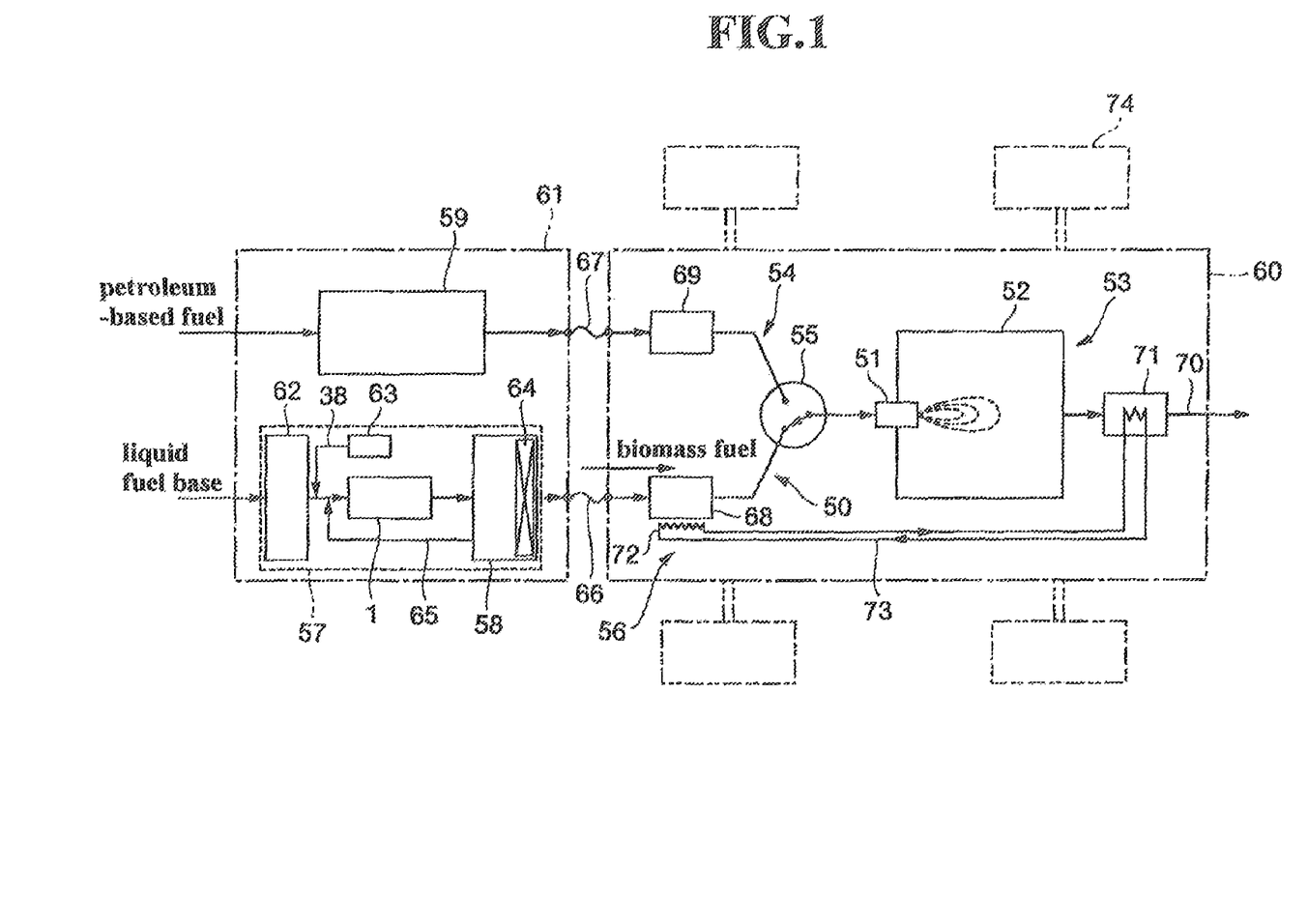
FIG. 1 is a schematic drawing of a bio-diesel fuel engine system.

A petroleum fuel supply system 54 is provided adjacent to the biomass fuel supply system 50 to supply a petroleum-based fuel such as light oil or heavy oil. Both fuel supply systems 50 and 54 are connected to a switching valve 55 which provides means of supplying the fuel injector 51 with either petroleum-based fuel or biomass fuel. Heater 56 is installed adjacent to the biomass fuel supply system 50 to raise the temperature of the biomass fuel. A reformulation unit 57, which produces the biomass fuel from the liquid fuel base and which includes the atomizer 1, is detachably connected to the biomass fuel supply system 50. The reformulation unit 57 includes a biomass fuel holding tank 58 which stores the biomass fuel produced by the reformulation unit 57. A petroleum, fuel holding tank 59, which is provided adjacent to the biomass fuel holding tank 58, is detachably connected to the petroleum fuel supply system 54, thus forming a fuel holding structure incorporating both tanks 58 and 59.

Basically, the bio-diesel fuel engine operating method operates conventional diesel engines by combusting a biomass fuel which has been atomized to a particulate size of less than 10 μm by the atomizer 1, the biomass fuel having been previously reformulated from a liquid fuel base of a fat-containing vegetable or animal, oil to which a surfactant has been added. The biomass fuel is supplied to the fuel injector 51, through the biomass fuel supply system 50, and sprayed by the fuel injector 51 into the engine cylinder 52 where the fuel is combusted to drive the diesel engine 53.

This example of the bio-diesel fuel engine system primarily comprises diesel engine unit 60, which includes a diesel engine 53 and which is used in various factories or vehicles, and a fuel system 61 which prepares and supplies the biomass fuel to the diesel engine unit 60.

The liquid fuel base, which may be any number of liquid state biomass source materials in the form of a fat-containing animal or vegetable oil, has as its main component, or major part thereof, a fatty acid normally not considered appropriate for turning into fuel. These source materials may take various animal or vegetable oils and fats, for example, processed oils such as butter; fatty animal oils such as beef or pork fat; fatty vegetable oils such as palm kernel oil, palm oil, coconut oil, soy bean oil sesame oil, rice bran oil, safflower oil, olive oil, rapeseed oil (high olein or high linoleic) sunflower seed oil or corn oil; and fish oils such as those extracted from yellow fin tuna, sardines, or salmon. Water may or may not be added to the liquid state biomass source material. Moreover, appropriate solid substances may be thermally melted and used as the liquid state biomass source materials.

A reformulation unit 57, which produces a biomass fuel from the liquid fuel base, is installed to the fuel system 61. Reformulation unit 57 primarily comprises a liquid biomass source material task 62 which holds the liquid fuel base, atomizer 1 (to be described subsequently) which atomizes the liquid fuel base supplied from tank 62 to a particulate diameter of less than 10 μm, additive-system 38, which includes an additive tank 63, through which a surfactant is added to the liquid fuel base entering the atomizer 1, and a biomass fuel holding tank 58 which temporarily stores the atomized biomass fuel exiting the atomizer 1.

A filter 64 is installed adjacent the discharge side of the biomass fuel holding tank 58 to only allow the passage of fuel particles having a diameter of 10 μm or less. Moreover, a recirculation system 65 is provided between the biomass fuel holding tank 58 and the inlet side of the atomizer 1 to supply the previously atomized biomass fuel back to the atomizer 1 as a means of increasing the effectiveness of the atomization process. An oil supply hose 66 is detachably connected to the discharge side of the biomass fuel holding tank 58 to supply biomass fuel to the diesel engine unit 60. Moreover, the fuel system 61 includes a petroleum fuel holding tank 59 adjacent to the biomass fuel holding tank 58, the tank 59 having the purpose of temporarily storing petroleum-based fuel such as light or heavy fuel oil. An oil supply hose 67 is detachably connected to the tank 59 with the purpose of supplying petroleum-based fuel to the diesel engine unit 60.

The diesel engine unit 60 is primarily structured from a biomass fuel supply system 50 which is detachably connected to the biomass fuel holding tank 58 in the reformulation unit 57 through the oil supply hose 66, a petroleum fuel supply system 54 which is detachably connected to the petroleum fuel holding tank 59 through the oil supply hose 67, the diesel engine 53, a fuel injector 51 which injects fuel into the engine cylinder 52 of the diesel engine 53, and a switching valve 55 connecting the fuel supply systems 50 and 54 to the fuel injector 51, the operation of the switching valve 55 providing means of selectively supplying fuel from either the petroleum fuel supply system 54 or the biomass fuel supply system 50 to the fuel injector 51.

The biomass fuel supply system 50 includes a biomass fuel tank 68 which holds biomass fuel supplied from the reformulation unit 57 in the fuel system 61. The petroleum fuel supply system 54 includes a petroleum fuel tank 69 which holds petroleum-based fuel supplied from the petroleum fuel holding tank 59 in the fuel system 61. Control of the switching operation of the switching valve 55 between the petroleum fuel supply system 54 and the biomass fuel supply system 50 is conducted based on the desired time. For example, the switching valve 55 may operate to connect the petroleum fuel supply system 54 to the fuel injector 51 when the engine is cold, such as when it is first started, or when running at low speed, to operate the diesel engine 53 on petroleum-based fuel. Other operating conditions require that the switching valve 55 may operate to connect, the biomass fuel supply system 50 to the fuel injector 51 to run the diesel engine 53 on biomass fuel.

The diesel engine unit 60 incorporates a heater 56 which heats the biomass fuel to lower its viscosity. The heater 56 includes a heat exchanger 71 which is connected to the exhaust system 70 of the diesel engine 53 and which transfers thermal energy from the exhaust gas of the diesel engine 53 to a thermal medium, a heater element 72 which is connected to the biomass fuel tank 68 to transfer the thermal energy in the aforesaid thermal medium to the biomass fuel, and a thermal medium circulation system 73 which circulates the thermal medium between the heater element 72 and heat exchanger 71. The biomass fuel from the biomass fuel supply system 50, of the petroleum-based fuel from the petroleum fuel supply system 54, may be selectively supplied to the fuel injector 51 through the operation of the switching valve 55. The biomass or petroleum fuel supplied to the fuel injector 51 is sprayed into the engine cylinder 52 where it is combusted by compression ignition, thereby generating the power output by the diesel engine 53. Elements 74 shown in FIG. 1 represent the wheels of a vehicle, should the diesel engine unit 60 be used as the power plant of a vehicle.

Figure 2:
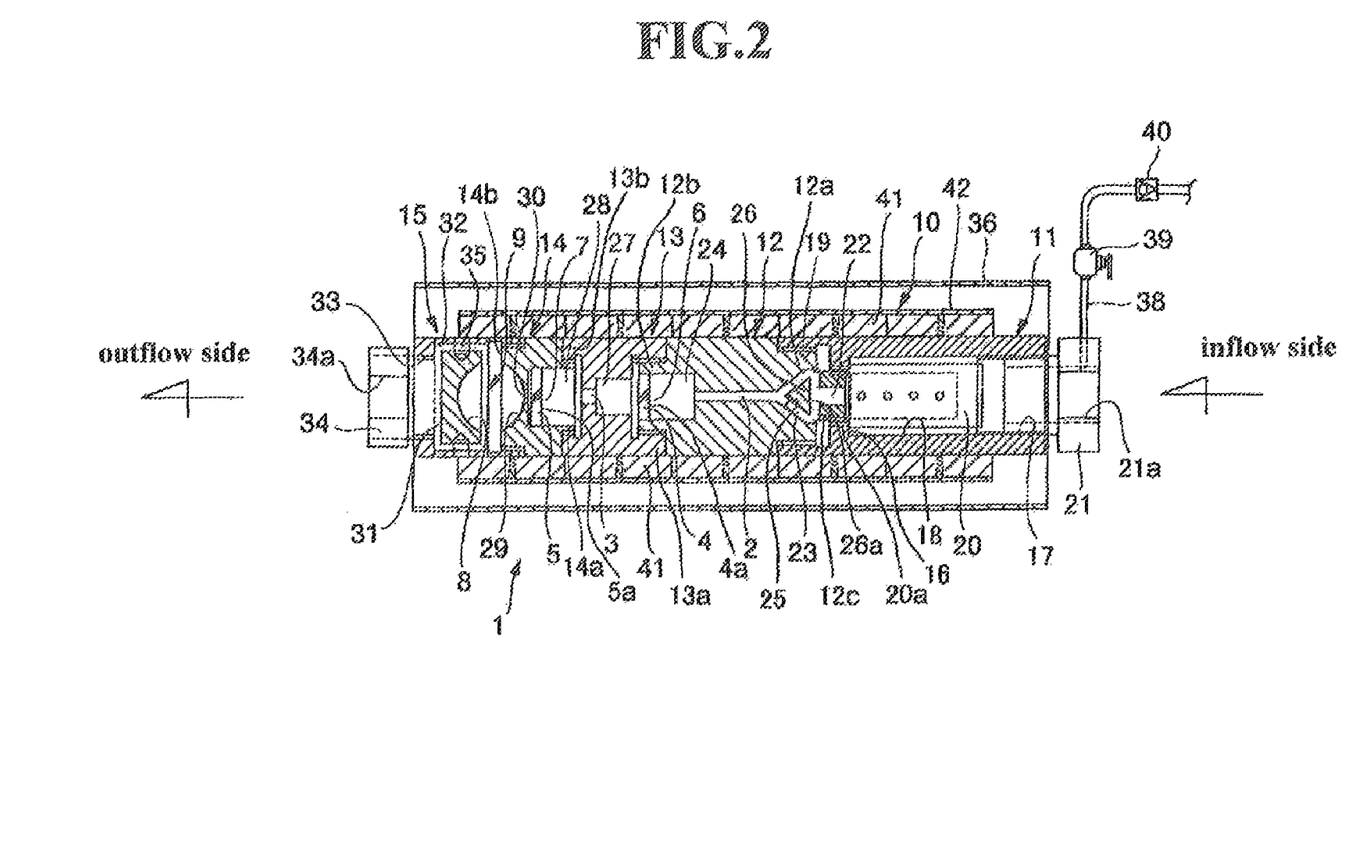
FIG. 2 is a lateral cross section of one example of the atomizer which may be preferably used in the system shown in FIG. 1.
Figure 3:
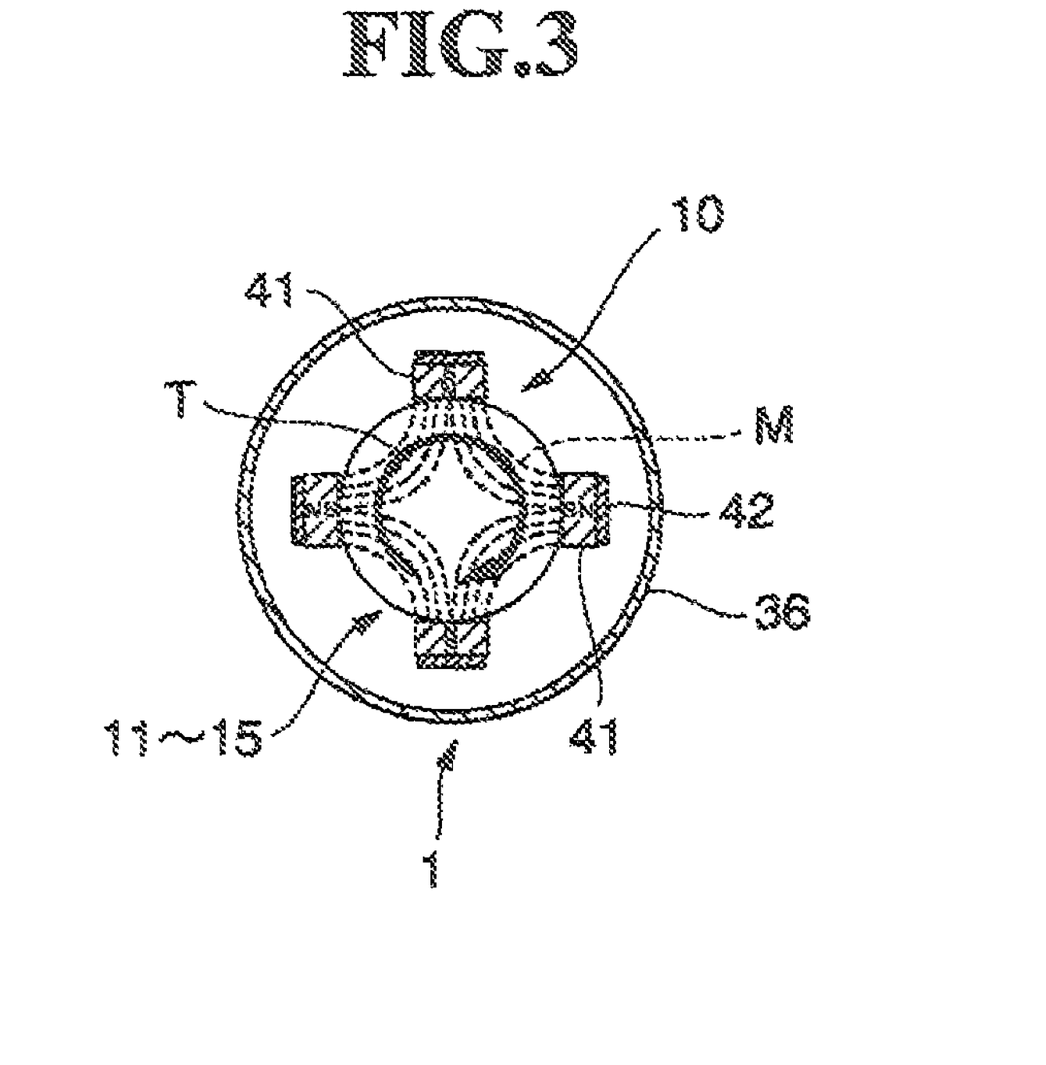
FIG. 3 is a plan view of the magnetizing unit of the atomizer shown in FIG. 2.

FIGS. 2 and 3 describe an example of the atomizer 1 which atomizes tire liquid fuel base (hereafter referred to as the "fuel"), that is, the liquid state biomass source material, to a particulate diameter of less then 10 μm. Atomizer 1, which receives the fuel from a pressure pump (not shown in the drawings), incorporates 1st and 2nd nozzles 2 and 3 which accelerate the fuel entering the atomizer 1, and freely rotatable 1st and 2nd rotors 4 and 5 which are disposed in axial alignment opposing the nozzles 2 and 3, rotors 4 and 5 having rotor faces 4a and 5a disposed at right angles in the fuel flow path, thus providing surfaces against which the fuel collides. A 1st diagonal slit 6 and 2nd diagonal, slit 7 are formed through the rotors 4 and 5 respectively at the perimeter of the rotor faces 4a and 5a, the rotation of the rotors 4 and 5 resulting in slits 6 and 7 shearing and breaking up the flow of fuel while concurrently generating an axially revolving fuel flow pattern. Nozzles 2 and 3 are disposed in the direction of fuel flow with the diameter of the 1st nozzle 2 on the upstream side being smaller than that of the 2nd nozzle 3 on the downstream side. The rotors 4 and 5 are disposed in the fuel flow path with the diameter of die rotor 4 on the upstream side being smaller than the diameter of the rotor 5 on the downstream side. The diagonal slits 6 and 7 are disposed in the fuel flow path with the size of the slit 6 on the upstream, side being smaller than that of the slit 7 on the downstream side. A mixing chamber 9, which incorporates a curved concave surface, in the form, of 1st cupped wall 8, is provided on the downstream side of the nozzles 2 and 3 and the rotors 4 and 5, thereby creating a structure in which the laminar flowing fuel is agitated and mixed within the mixing chamber 9 as a result of its collision with the 1st cupped wall 8.

A magnetizing unit 10 is provided to magnetize the fuel. The magnetizing unit 10 is aligned with the direction of fuel flow as a jacket-like structure extending along and encompassing nozzles 2 and 3, rotors 4 and 5, and mixing chamber 9.

The atomizer 1 shown in the drawings is structured primarily of five cylindrical blocks, shown, as elements 11-15 in the drawings, which are fastened together in axial alignment by detachable threaded fasteners. The 1st cylinder block 11 is formed from a non-magnetic material to suppress the influx of magnetic waves. A chamber 18 and a 1st concave part 19 defined by a cylindrical wall 16 of the 1st cylinder block 11 are sequentially disposed within the 1st cylinder block 11 in alignment with the path of fuel flow. The chamber 18 has an inflow port 17 at the end thereof, and a 1st concave part 19 is attached to the 2nd cylinder block 12. A strainer 20 is thread, mounted at exit port 20a to the internal circumference of the cylindrical partition wall 16 in the chamber 18 to remove any foreign matter from the fuel. An inlet bushing 21 is screw mounted to the inflow port 17 of the chamber 18 and has an inlet port 21a for directing the flow of fuel therein. Additive system 38 is connected to the inlet bushing 21 to add a surfactant to the inflow of the fuel. A surfactant cutoff valve 39 having the purpose of allowing or stopping the flow of surfactant and a backflow stop valve 40 having the purpose of preventing the reverse flow of the surfactant are installed to the additive system 38. The fuel, which has been supplied from the liquid biomass source material tank 62 and to which the surfactant has been added by the additive system 38, flows into the 1st cylinder block 11 through the inlet port 21a of the inlet bushing 21, and further flows toward the 1st concave part 19 from the exit port 20a, through the strainer 20 which removes foreign matter.

Convex end parts 12a and 12b are respectively formed on the opposing ends of the 2nd cylinder block 12. The convex part 12a on the end of the 2nd cylinder block 12 is attached to the 1st concave part 19 of the 1st cylinder block 11 by a screw thread connection. Moreover, a projecting boss 12c, which resides within the exit port 20a of the strainer 20, is formed on the convex end part 12a. The 2nd cylinder block 12 incorporates an inflow orifice 22, a cone-shaped flow channel 23 which has a continuously narrowing cross section, the aforesaid 1st nozzle 2 which accelerates fuel flow, and a 1st rotor chamber 24 in which resides the aforesaid 1st rotor 4, along the fuel flow path from the convex end part 12a of the projecting boss 12c to the opposing convex end part 12b sequentially. The inflow orifice 22 is formed within the projecting boss 12c and connects to the exit port 20a of the strainer 20.

The cone-shaped flow channel 23 is created in the space between a cone-shaped block 26 and a cone-shaped recess 25 formed within the 2nd cylinder block 12, the cone-shaped block 26 being supported by an appropriate connection to the surface of the cone-shaped recess 25. A facing wall 26a is formed on the large end of the cone-shaped block 26 in opposition to the inflow orifice 22. One end of the cone-shaped flow channel 23 having the larger cross section connects to the inflow orifice 22, and the other end having the smaller cross section connects to the 1st nozzle 2. The 1st nozzle 2 resides between and connects the cone-shaped flow channel 23 and a 1st rotor chamber 24 which is formed with an internal diameter larger than that of the 1st nozzle 2.

The 1st rotor 4 is installed as a freely rotatable member within the 1st rotor chamber 24 with the 1st rotor face 4a of the rotor 4 being opposed the 1st nozzle 2. The 1st rotor 4 is also installed so as to be able to slide freely within the 1st rotor chamber 24 along the axis of fuel flow. Two 1st diagonal slits 6 are formed on the outer perimeter of the 1st rotor 4 at locations mutually separated at 180°. Each of the diagonal slits 6 is formed completely through the circumferential surface of the 1st rotor 4 in the thickness direction, at an angle leading toward the circumferential direction of the 1st rotor 4. The directions of these diagonal slits 6 are set the same.

The fuel exiting the exit port 20a of the strainer 20 flows into the inflow orifice 22 of the 2nd cylinder block 12 from where it collides with the facing wall 26a of the cone-shaped block 26. The collision causes the fuel to break up, atomize, and flow outward in a radially widening pattern along the facing wall 26a toward the cone-shaped flow channel 23. The fuel is sheared and again fractured around the edge of the cone-shaped block 26 connected to the cone-shaped channel 23 as it flows into the cone-shaped channel 23. The fluid pressure is increased again as the fuel flows into the 1st nozzle 2 due to the previously noted cone-shaped flow channel 23 having a cross section which continually narrows in the direction of fuel flow. The 1st nozzle 2 accelerates to make the flow of fuel spout out toward the 1st rotor chamber 24.

The fuel entering the 1st rotor chamber 24 collides with the rotor face 4a of the 1st rotor 4, thus resulting in the fuel fracturing, atomizing, and flowing outward in a radially widening pattern against the rotor face 4a from where it flows into the 1st diagonal slits 6. The flow of fuel through the 1st diagonal slits 6 generates a unidirectional torque effect which results in the unidirectional rotation of 1st rotor 4. As a result of the rotation of the 1st rotor 4, the fuel passing through the 1st diagonal slits 6 is also subjected to a shearing action which imparts an axially rotating flow pattern to the fuel as it flows from the rotating 1st rotor 4 and is further fractured by the action of the 1st diagonal slits 6. The axially rotating fuel flow generated by the 1st rotor 4 creates a centrifugal force within the atomized fuel, thereby separating the fuel through the movements of the heavier molecules toward the outer part of the flow and the lighter molecules toward the inner part thereof. Moreover, the unidirectional axially rotating flow becomes a spiral laminar flow. The 1st rotor 4 is able to slide within the 1st rotor chamber 24 in reaction to the fluid, pressure applied against its front and rear surfaces, thereby creating a mechanism which balances the fluid pressure on both sides of the rotor and stabilizes the flow of the fuel.

Concave parts 13a and 13b are formed on the respective ends of the 3rd cylinder block 13 with the convex end part 12b of the 2nd cylinder block 12 being fastened to the concave part 13a by means of a threaded screw connection. The 4th cylinder block 14 attaches to the concave part 13b by means of a threaded screw connection. A rotational flow chamber 27 and the 2nd nozzle 3 are respectively formed, within the 3rd cylinder block 13, in the fuel flow path, extending from the concave part 13a on one end to the concave part 13b on the other, the rotational flow chamber 27 operating to maintain the axially rotating flow of fuel flow from the 1st rotor 4, and the 2nd nozzle 3 operating to accelerate the fuel flow. The axially rotating fuel flow exiting the 1st rotor 4 passes through the rotational flow chamber 27 and enters the 2nd nozzle 3 where it is accelerated. The diameter of the 2nd nozzle 3 is larger than that of the 1st nozzle 2. Taking into consideration that the speed of the fuel flow gradually decreases due to pressure losses, the size of the nozzle diameter is increased in relation, to the decrease in flow speed so that the flow volume is constant relative to time ((flow speed)×(nozzle diameter)).

Bosses 14a and 14b are formed on the respective ends of the 4th cylinder block 14 with the boss 14a, being attached to the concave part 13b of the 3rd cylinder block 13 by means of a threaded screw connection. An end of the 5th cylinder block 15 attaches to the boss 14b of the 4th cylinder block 14 by means of a threaded screw connection. The 4th cylinder block 14 includes, disposed in sequence and aligned along the path of fuel flow, a 2nd rotor chamber 28 housing a 2nd rotor 5, a 2nd capped wall 29 which forms the concave wall part of the mixing chamber 9, and a spray port 30 which connects the 2nd cupped wall 29 with the 2nd rotor chamber 28. The internal diameter of the 2nd rotor chamber 28 is greater than that of the 2nd nozzle 3.

The 2nd rotor 5 incorporates a pair of 2nd diagonal slits 7 oriented in the same direction as the 1st diagonal slits 6, is structured essentially the same as the 1st rotor 4, and has a diameter larger than that of the 1st rotor 4. With the 1st and 2nd rotors 4 and 5 rotating at the same speed, the larger circumference of the 2nd rotor 5 moves at a faster, rate than the smaller circumference of the 1st rotor 4. Therefore, even if the fuel flow rate decreases, the strength of fee axially rotating flow pattern increases as the fuel exits the 2nd diagonal slits 7. Moreover, as the 2nd diagonal slits 7 are formed to a larger dimension than the 1st diagonal slits 6, the 2nd diagonal slits 7 are able to maintain a uniform flow volume in the same manner as applied to the determination, of the nozzle diameters.

The fuel, which is now flowing in an axially rotating pattern, in which the lighter molecules have been separated from the heavier ones, exits the 2nd nozzle 3 of the 3rd cylinder block 13, enters the 2nd rotor chamber 28, collides with the rotor face 5a of the 2nd rotor 5 where it is further fractured and atomized, and moves outward in a widening radial pattern along the rotor face 5a and through the 2nd diagonal slits 7. Passing through the 2nd diagonal slits 7, the fuel makes the 2nd rotor 5 rotate in the same direction as the rotating force applied, to the 1st rotor 4. Concurrently, the rotational movement of the 2nd rotor 5 causes the 2nd diagonal slits 7 to apply a shearing force to the fuel which strengthens the spiral flow and further fractures the fuel as it exits from the 2nd rotor 5.

The atomization of the fuel is further promoted in the 4th cylinder block 14, and the 2nd rotor 5 having a larger diameter than that of the 1st rotor 4 operates to maintain the rotating flow pattern while strengthening the centrifugal separation effect between the heavier and lighter molecules by a more effective centrifugal force. Moreover, the 2nd diagonal slits 7 are disposed at the same directional angle as that of the 1st diagonal slits 6 to maintain the fuel flow as an axially rotating laminar flow. The 2nd rotor 5 is also able to slide freely within the 2nd rotor chamber 28 in response to the fluid pressure applied against its front and back surfaces, the sliding movement of the 2nd rotor 5 having the effect of balancing the pressure on both sides of the 2nd rotor 5 and thus stabilizing the fuel flow. The fuel passing through the second rotor 5 is an atomized axially rotating laminar flow in which the heavier molecules are at the outside part of the flow and the lighter molecules at the inside part thereof, and is sprayed from the spray port 30 in this condition.

The 5th cylinder block 15 incorporates a housing chamber 32 in which resides a wail block 31 having a convex wall part in the form of a 1st cupped wall 8. One end of the 5th cylinder block 15 attaches to the boss 14b on the end of the 4th cylinder block 14 by means of screw threads, and the other end, which is formed as a discharge port 33, connects to a discharge bushing 34 which incorporates a discharge orifice 34a, by means of screw threads. The wall block 31 is fixedly secured to the 5th cylinder block 15 by threaded bolts 35. The 1st cupped wall 8 is disposed in opposition to the spray port 30 and the 2nd cupped wall 29, the space between cupped walls 8 and 29 defining the spherically shaped mixing chamber 9. The mixing chamber 9 connects to the discharge orifice 34a through the space defined fey the wall block 31, the internal surfaces of the housing chamber 32 of the 5th cylinder block 15 and the boss 14b of the 4th cylinder block 14.

The mixing chamber 9 is a spherical space in which the fuel exiting the spray port 30 in an axially rotating flow pattern is further atomized by collision with the 1st cupped wall 8 disposed in opposition to the spray port 30. In addition, as a result of the configuration of the hemispherical space created between the 1st cupped wall 8 and the 2nd cupped wall 29, the fuel, having undergone the aforesaid collision, is not immediately discharged from the mixing chamber 9, but rebounds repeatedly within the chamber 9 and thus momentarily collects therein. Moreover, the fuel within the mixing chamber 9 is repeatedly agitated by the following fuel exiting from the spray port 30 in a unidirectional axially rotating laminar flow. Because the fuel is agitated from an axially rotating laminar flow, it is maintained in a highly atomized condition in which the flocculation of the atomized particles is suppressed to a 
degree not to be obtained by means of agitating by the axially rotating flow with turbulence. The agitation mechanism within the mixing chamber 9 has the effect of further and more completely atomizing the fuel which has entered in an atomized state but with the heavier and lighter molecules separated, and thus chamber 9 is able to aid in the generation of a highly atomized biomass fuel.

The biomass fuel, having been reformed and generated, through this mechanism, is discharged from the mixing chamber 9 through the discharge orifice 34a into the biomass fuel holding tank 58. Although the fuel flowing in from the liquid biomass source material tank 62 through the inlet port 21a is of a non-uniform consistency having various size particles in a flocculated state and exhibits irregular molecular bonds, the operation occurring within the cylinder blocks 11-15 makes it possible to generate a stable and finely atomized biomass fuel of uniform consistency having a particulate size of approximately 10 μm and exhibiting no flocculation nor irregular bonding. Moreover, the stability of the biomass fuel is maintained by the addition of the surfactant which envelopes each fuel particle.

In addition, the magnetizing unit 10 is installed to ionize the fuel through the application of a magnetic force. The magnetizing unit 10 shown in the drawings is formed as a tube-shaped structure which envelopes the cylinder blocks 11-15. Moreover, the magnetizing unit 10 envelopes the cylinder blocks 11-15 through a structure comprising groups of four magnets 41 mounted to a magnetic support plate 42 wherein the two magnets 41 on the vertical plane are oriented in mutual opposition with their north poles faced each other, and the two magnets 41 on the horizontal plane are oriented in mutual opposition with their south poles faced each other. Multiple sets of the four magnets 41 are disposed along the 1st cylinder block 11 through 5th cylinder block 15 of the atomizer 1. By arranging the poles of each magnet 41 in opposition to the same pole of the opposing magnet 41, a strong magnetic field 'M' is generated between the north and south poles of the adjacent magnets 41 around the external circumference of the cylinder blocks 11-15 at a right angle to the direction of fuel flow as particularly shown in FIG. 3. The perimeter region of the cylinder blocks 11-15 is an area where the heavier centrifugally driven molecules collect as a result of the axially rotating flow T. In other words, this structure makes it possible to effectively and efficiently ionize the heavier molecules having high polymeric structures, and thus promotes fine atomization of the fuel.

The operation of the magnetizing unit 10 is well known. The generation of a magnetic field around, the fuel flowing through the cylinder blocks 11-15 promotes a low molecular weight in the fuel by disrupting electrical equilibrium, prevents re-bonding and re-flocculation, and magnetically atomizes the fuel. Each particle of the atomized biomass fuel is enveloped within the surfactant to maintain the fuel in a stable atomized state. As shown in the drawings, a cylindrical magnetic shield 36 of a non-magnetic material encases both the cylinder blocks 11-15 and the magnetizing unit 10.

As illustrated in the drawing of the atomizer 1, the nozzles 2 and 3, which accelerate the flow of fuel, are disposed in the path of fuel flow with the upstream 1st nozzle 2 having a diameter smaller than that of the downstream 2nd nozzle 2. Moreover, the diagonal slits 6 and 7 are disposed in the path of fuel flow with the upstream 1st diagonal slits 6 being dimensionally smaller than the downstream 2nd diagonal slits 7. This structure can maintain a uniform fuel flow volume within the cylinder blocks 11-15 against lowering the velocity of the flow by the pressure loss, thus stabilizing the flow volume to increase the efficiency of the atomization process.

Moreover, regarding the dimensions of the rotors 4 and 5 which are disposed within the fuel flow path, rotors 4 and 5 are able to provide a desired operational effect in response to the deceleration of the fuel flow, because the external diameter of the upstream 1st rotor 4 is smaller than that of the downstream 2nd rotor 5. That is, at the stage where the fuel flow is faster, an axially rotating fuel flow having a strong centrifugal action is generated, even if the speed differences are small between the central, intermediate, and outer circumferential regions of the 1st rotor 4. At the stage where the fuel, flow becomes slower, the rotation of the larger diameter 2nd rotor 5 can strengthen the axially rotating flow of fuel as a result of the larger speed difference between the central and outer circumferential regions of the 2nd rotor 5. The setting of the configuration of the rotors 4 and 5 and the fuel flow volume established, by the adjustment of the dimensions of the aforesaid slits 6 and 7 have the combined effect of efficiently atomizing the fuel, separating the heavier molecules from the lighter molecules, and generating an axially rotating laminar flow in the 2nd cylinder block 12 through 4th cylinder block 14, thus reducing the number of operations required within the atomizer 1 and highly improving atomization process.

Furthermore, due to the structure of the mixing chamber 9 in which the axially rotating laminar fuel flow is mixed as a result of collision against the 1st and 2nd cupped walls 8 and 29, the mechanism by which the fuel is held and agitated, within the spherical mixing chamber 9, after the fuel having entered in a molecularly separated axially rotating laminar flow state, can obtain a highly efficient agitation and mixing process which is more effective than one in which the fuel were to collide against flat walls. The result is a significantly higher level of fuel reformation from a single atomization process.

Moreover, because the magnetizing unit 10 envelopes nozzles 2 and 3, rotors 4 and 5, and tire mixing chamber 9, the structure whereby the magnetizing unit 10 axially encloses the cylinder blocks 11-15 has the effect of reducing the size of the atomizer 1 while providing a simultaneous mechanically and magnetically based atomization process which provides a level of atomization efficiency not possible it these two processes were to be separated.

Although not shown in the drawings, the atomizer 1 may be structured to make use of any one of a number of devices to break down molecules to a low molecular state. These devices may include homogenizers, microwave generators, ultra-short wave magnetic wave generators, ultrasonic wave generators, vapor cooling devices, centrifugal separators, supercritical substance generators, irradiation devices and the like.

The following explains the operation, of the bio-diesel fuel engine system and bio-diesel fuel engine operating method as described in the above example. Petroleum-based fuel is transported by a tanker truck or other means and deposited into the petroleum fuel holding tank 59 of the fuel system 61. The liquid fuel base, in the form of a biomass source material, is transported by a tanker truck or other means and stored in tire liquid biomass source material tank 62 of the fuel system 61. A surfactant is added to the liquid biomass fuel base as it leaves the liquid biomass source material tank 62, and the liquid biomass fuel base is then atomized as it flows through the atomizer 1, after which it is stored in the biomass fuel holding tank 58. The biomass fuel in tank 58 is, to tire extent required, re-circulated and re-atomized as it passes through the atomizer 1 again via the recirculation system 65.

The filter 64 allows only the biomass fuel having a particulate size of less than 10 μm to pass from the biomass fuel holding tank 58 into the biomass fuel tank 68 of the diesel engine unit 60. The petroleum-based fuel is supplied to the petroleum fuel tank 69 of the diesel engine unit 60 from the petroleum fuel holding tank 59 via the oil supply hose 67. The switching valve 55 is used to supply the desired type of fuel to the diesel engine 53 in response to the time that the specific fuel is required. For example, at the time when diesel engine 53 is to start, the switching valve 55 may operate to connect the fuel injector 51 to the petroleum fuel supply system 54 to supply petroleum-based fuel. After the diesel engine 53 starts, the switching valve 55 operates to direct atomized biomass fuel generated previously by the reformation unit 57, from the biomass fuel supply system 50 to the fuel injector 51 which injects the biomass fuel into the engine cylinder 52.

Figure 4:
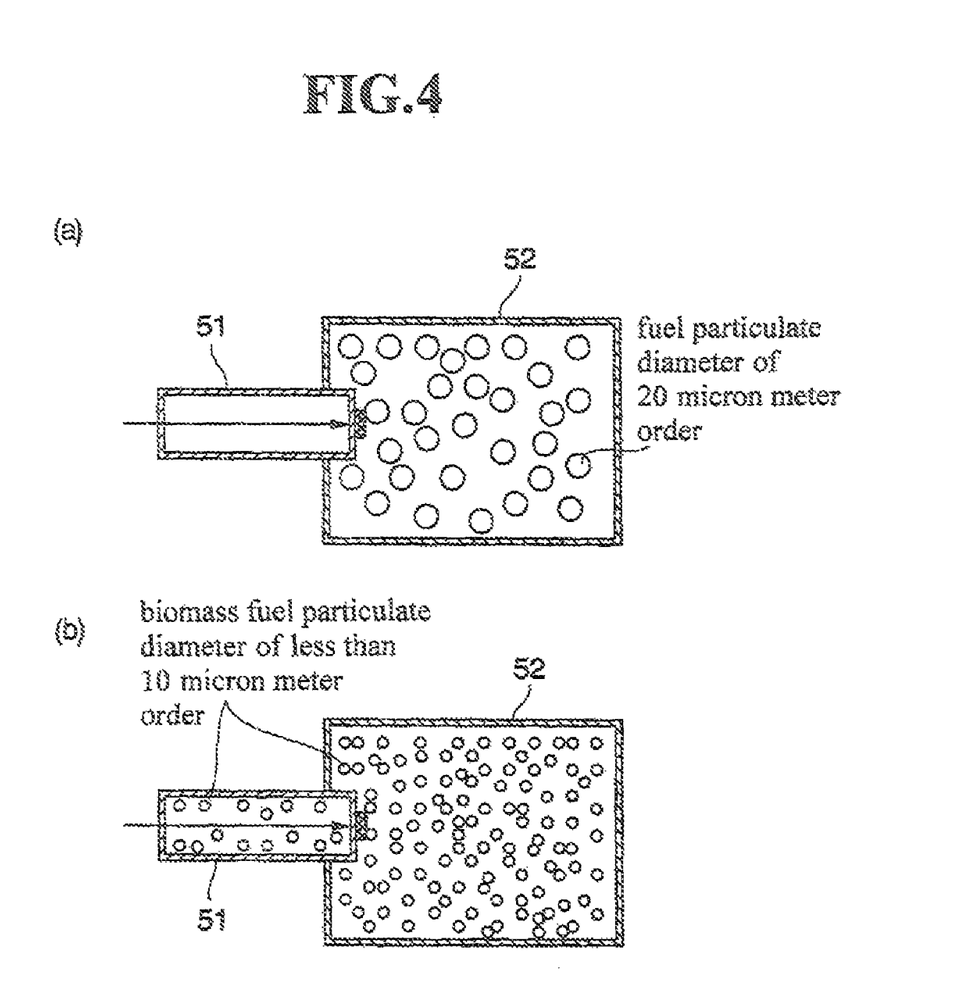
FIG. 4 is a schematic drawing, of showing a mist condition of conventional fuel sprayed from a conventional fuel injector

FIG. 4a describes the misted condition of a conventional fuel when sprayed from a conventional fuel injector 51. FIG. 4b describes the misted condition of the liquid biomass fuel prepared according to our systems and methods when sprayed from, a conventional fuel injector 51. The mist of the convention fuel which depends on the performance of the fuel injector 51 has a particulate size of approximately 20 μm as opposed to the less than 10 μm particulate size of the biomass fuel prepared according to our atomizing process. Because our systems and methods are able to supply a pre-atomized biomass fuel having a particulate diameter of less than 10 μm to the fuel injector 51, it becomes possible for the fuel injector 51 to inject a finely misted biomass fuel, which has been produced from a biomass source material of a fat-containing animal or vegetable oil, into the engine cylinder 52.

The previously described example of the bio-diesel fuel engine system and bio-diesel fuel engine operating method puts forth a structure for atomizer 1 capable of generating a very finely atomized biomass fuel before it is supplied to the fuel injector 51. As a result, the liquid biomass fuel can be reformed from various types of oils containing glycerin and/ or highly viscous oils which have proven conventionally difficult to use as a base material for a biomass fuel. The biomass fuel is therefore able to be injected, by the conventional fuel injector 51, into the engine cylinder 52 where it may be appropriately combusted.

The extremely fine particles of fuel atomized by the atomizer 1 have a surface area ¹⁄₁₀₀ the size of fuel particles which have been atomized only by the operation of the fuel injector 51, and have a total oil droplet surface area, that is, a total fuel-air surface area, which is ten times greater. The fuel thus provides a significantly higher level of combustion efficiency than that achieved with a normally operating diesel engine. In addition, due to the light weight of each droplet of atomized fuel, injection mist dispersion is highly uniform, combustion rise time is greatly improved, an improved ignition is introduced from an advanced cetane number index, and flame propagation speed is significantly increased. Therefore, the biomass fuel aids in the establishment of the desired air-fuel mixture within the engine cylinder 52, promotes fast ignition, a high rate of combustion, and highly uniform combustion dispersion.

Our methods are not a reforming process based on a methyl-ester chemical reaction, but rather a reforming process whereby the atomizer 1 atomizes a liquid biomass base to which only a surfactant has been added to produce a bio-diesel fuel from a fat-containing vegetable or animal oil. The reforming process is low in cost, does not require expensive equipment nor the expense and inconvenience of byproduct processing, and is capable of producing a biomass fuel which is cheaper than light fuel oil. The reforming process without chemical reactions does not substantially make the basic character of the biomass fuel change. Moreover, a yield rate close to 100% is realized in a process which generates no byproducts such as the glycerin generated in the methyl-ester process. Furthermore, the atomization process permits palm oil and other like substances, which have proven difficult to process into bio-diesel fuel, to be used for bio-diesel fuel. Biomass source materials for use with this process are easily procured, and the resulting bio-diesel fuel is an excellent replacement for light fuel oil.

Considering that oils containing edible fat have no sulfur component, and that both animal and vegetable oil likewise substantially have no sulfur component, this allows a catalytic converter, such as that used with a gasoline powered engine, to be used to remove nitrous oxide from the exhaust of a diesel engine burning the bio-diesel fuel. Because a catalytic converter is used to remove nitrous oxide from the exhaust gas, the diesel engine may be designed with the major emphasis placed on suppressing particulate emissions, thereby making it possible to produce a diesel engine which emits a highly cleansed exhaust gas.

Not only does our system eliminate the need, for a chemical reaction process in the reforming of bio-diesel fuel, but it allows the reforming of a biomass fuel without removing the glycerin component so the glycerin can be used as a lubricant which improves the reciprocating motion of the piston in the cylinder which in turn decreases fuel consumption, increases torque output, reduces engine noise, and decreases the possibility of mechanical damage resulting from burning a fuel produced by the methyl-ester reforming process. The high thermal output of a combusted biomass fuel is maintained because there is no need to employ a glycerin removal process. These factors therefore make it possible to use the biomass fuel "as is" in existing diesel engines.

In other words, despite the fact that the performance of the fuel, injector used in a conventional diesel engine is subject to various limitations relating to physical and chemical factors which include the viscosity characteristics of the fuel, we make it possible to operate a diesel engine on a wide variety of fuels derived from non-sulfurous biomass base liquids, not to mention light and heavy fuel oil, and to obtain a clean combustion process burning a vegetable or animal oil as fuel, thus significantly decreasing the dependence of the diesel engine on a petroleum-based fuel. Moreover, the biomass fuel is low in cost improves engine durability, and exhibits excellent thermal efficiency, therefore promoting clean combustion within a diesel engine.

Moreover, the atomizer 1 is able to break the electrical equilibrium of polymeric molecular fuel basis generally having stable bonds, atomize the fuel into a low molecular state, and prevent molecules from, re-bonding, through the application of a mechanical shearing force and magnetic energy to the biomass fuel, and then it is possible to generate an atomized, diesel fuel having a particulate size of approximately from a few microns through 10 μm as opposed to the approximately 20 μm size of the atomized fuel particles in a conventional diesel engine. In addition, the added surfactant coats tire low level molecules to prevent re-bonding and re-flocculation, stabilizes the particulate structure of the fuel, and preserves the fuel for long periods of time, thus promoting the stable utilization of tire fuel for operation of the diesel engine.

Reformulation unit 57 may be structured as a single transportable unit, thereby allowing it to be transported and connected to any type of diesel engine unit 60. Petroleum fuel holding tank 59 and biomass fuel holding tank 58 may be installed together to serve as fixed fuel holding tanks at fueling stations or other appropriate locations. In either case, the biomass fuel which is produced anywhere may be transported to the biomass fuel holding tank 58 by a tanker truck or other appropriate conveyance. In addition, the reformulation unit 57 may be structured for installation to a vehicle, and thus be used as an onboard fuel source for a diesel powered automobile or other like device.

Table 1 shows the fuel consumption efficiency obtained when a 7-ton truck (manufactured by Hino Motors Inc., 700,000 kilometrage) was equipped with the bio-diesel fuel engine system, as embodied in this specification, and operated on public roads for a test run. The vehicle was subjected to a government mandated vehicle inspection which is required of all vehicles operated on public roads. The switching valve 55 was used to alternately switch between fuels.

TABLE 1

|  | distance driven in km | % of bio-diesel fuel | mileage in km/liter |
|---|---|---|---|
| March, 2005 | 7,136 | 83 | 3.91 |
| April, 2005 | 6,026 | 85 | 4.22 |
| May, 2005 | 5,027 | 86 | 4.53 |
| June, 2005 | 5,940 | 81 | 4.67 |
| July, 2005 | 5,397 | 86 | 4.98 |
| August, 2005 | 5,401 | 95 | 4.74 |
| September, 2005 | 5,945 | 88 | 4.32 |

The amounts of bio-diesel fuel used in the test are shown in Table 1 as a percentage of the total fuel of which the non-bio-diesel part was light fuel oil. As Table 1 illustrates, with more than 80% of the fuel being bio-diesel, distance driven was less than 4 km per liter of fuel in March, 2005, when the test began. The test was run for six months during which an improvement of fuel consumption was observed.

The invention claimed is:

1. A bio-diesel fuel engine system that uses a liquid state biomass source material of a fat-containing animal or vegetable oil as a liquid fuel base, comprising:
    a device that produces a biomass fuel by adding a surfactant to the liquid fuel base and atomizes the liquid fuel base to a particulate diameter of less than 10 μm with an atomizer, and
    a biomass fuel supply system supplying the biomass fuel to a fuel injector which sprays the biomass fuel into engine cylinders to power a diesel engine,
    wherein the atomizer comprises a plurality of nozzles for accelerating the liquid fuel base entering the atomizer; a plurality of freely rotatable rotors disposed in an axial alignment opposing each nozzle; a mixing chamber; and a magnetizing unit,
    the nozzles and rotors being alternately arranged along a fuel flow path;
    each rotor having a rotor face disposed at a right angle in the flow path and providing a surface against which the liquid fuel base collides;
    diagonal slits formed though each rotor at a perimeter of the rotor face, wherein the slits shear and break up the flow of liquid fuel base while concurrently generating an axially revolving fuel flow pattern when the rotor rotates;
    the nozzles being disposed in a direction of fuel flow with an upstream nozzle having a diameter smaller than that of a downstream nozzle;
    the rotors being disposed in the direction of fuel flow with an upstream rotor having a diameter smaller than that of a downstream rotor;
    the diagonal slits being disposed in the direction of fuel flow with an upstream slit having a size smaller than that of a downstream slit;
    the mixing chamber comprising a curved concave surface in a form of cupped wall and being disposed on a downstream side of the nozzles and rotors and creating a structure that agitates and mixes the flowing fuel within the mixing chamber as a result of collision of the flowing fuel with the cupped wall, and
    the magnetizing unit being aligned with a direction of fuel flow as a jacked-like structure extending along and encompassing the nozzles, rotors and mixing chamber for magnetizing the liquid fuel base;
    wherein the liquid state biomass source material is generated without employing a methyl-ester reforming process.

2. The bio-diesel fuel engine system according to claim 1, further comprising a petroleum-based fuel supply system supplying a petroleum-based fuel and a switching device that connects said biomass fuel supply system and petroleum-based fuel supply system with said fuel injector, said switching device switching the supply of fuel from either fuel supply system to said fuel injector.

3. The bio-diesel fuel engine system according to claim 1, further comprising a heating device installed to said biomass fuel supply system to heat the biomass fuel.

4. The bio-diesel fuel engine system according to claim 1, wherein a reformulation unit, which includes said atomizer and which produces the biomass fuel from the liquid fuel base, is detachably connected to said biomass fuel supply system.

5. The bio-diesel fuel engine system according to claim 4, wherein said reformulation unit further comprises a biomass fuel holding tank which stores the biomass fuel.

6. The bio-diesel fuel engine system according to claim 5, wherein a fuel storage structure is structured by said biomass fuel holding tank and a petroleum fuel holding tank, said petroleum fuel holding tank being detachably connected to said petroleum-based fuel supply system.

7. A method of operating a bio-diesel fuel engine using a liquid state biomass source material of a fat-containing animal or vegetable oil as a liquid fuel base, comprising:
    producing a biomass fuel by adding a surfactant to the liquid fuel base and atomizing the liquid fuel base to a particulate diameter of less than 10 μm with an atomizer, and
    supplying the biomass fuel, through a biomass fuel supply system, to a fuel injector which sprays the biomass fuel into engine cylinders to power a diesel engine,
    wherein the atomizer comprises a plurality of nozzles for accelerating the liquid fuel base entering the atomizer; a plurality of freely rotatable rotors disposed in an axial alignment opposing each nozzle; a mixing chamber; and a magnetizing unit,
    the nozzles and rotors being alternately arranged along a fuel flow path;
    each rotor having a rotor face disposed at a right angle in the flow path and providing a surface against which the liquid fuel base collides;
    diagonal slits formed though each rotor at a perimeter of the rotor face, wherein the slits shear and break up the flow of liquid fuel base while concurrently generating an axially revolving fuel flow pattern when the rotor rotates;
    the nozzles being disposed in a direction of fuel flow with an upstream nozzle having a diameter smaller than that of a downstream nozzle;
    the rotors being disposed in the direction of fuel flow with an upstream rotor having a diameter smaller than that of a downstream rotor;

the diagonal slits being diagnosed in the direction of fuel flow with an upstream slit having a size smaller than that of a downstream slit;

the mixing chamber comprising a curved concave surface in a form of cupped wall and being disposed on a downstream side of the nozzles and rotors and creating a structure that agitates and mixes the flowing fuel within the mixing chamber as a result of collision of the flowing fuel with the cupped wall, and the magnetizing unit being aligned with a direction of fuel flow as a jacked-like structure extending along and encompassing the nozzles, rotors and mixing chamber for magnetizing the liquid fuel base;

wherein the liquid state biomass source material is generated without employing a methyl-ester reforming process.

* * * * *